Patented Aug. 14, 1945

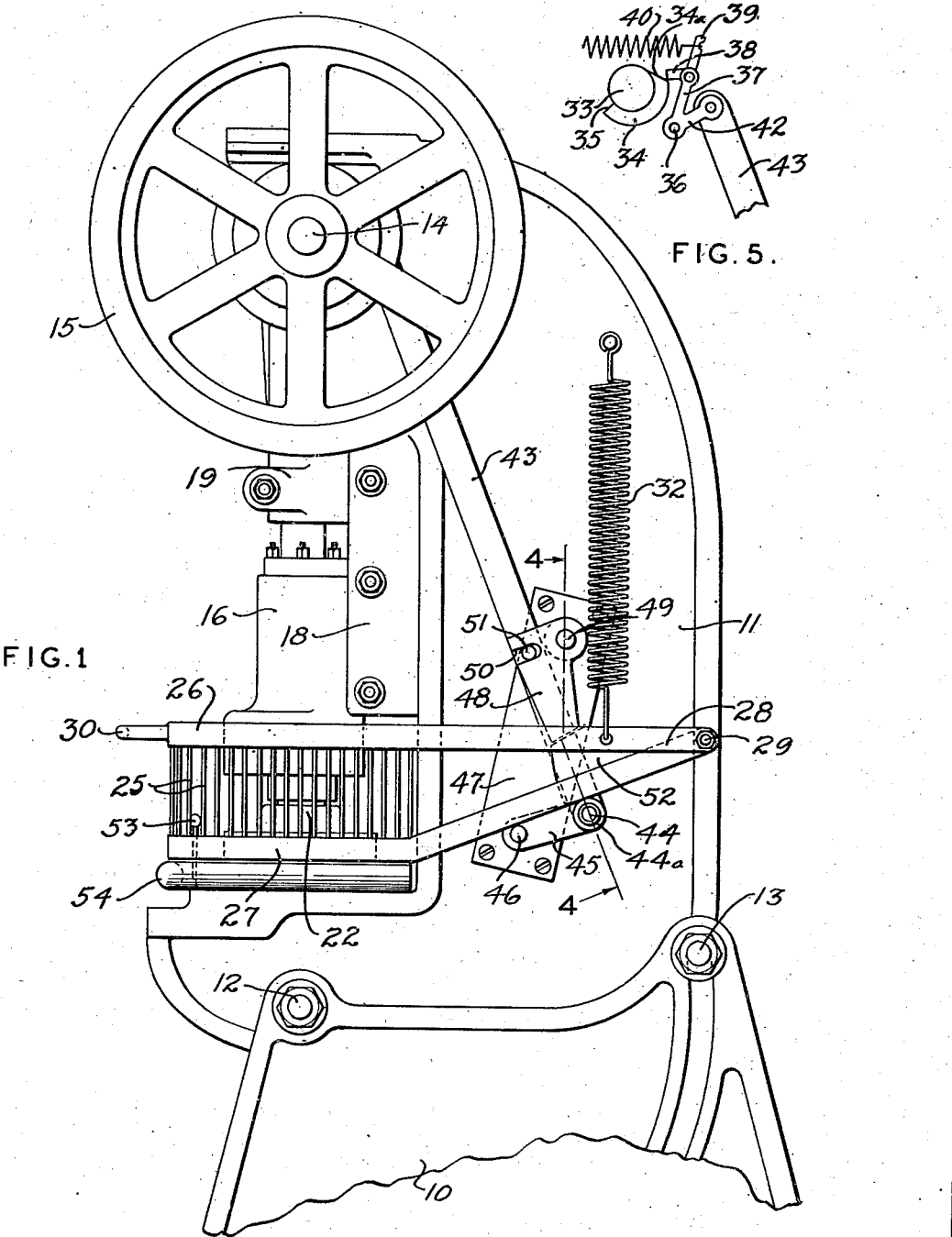

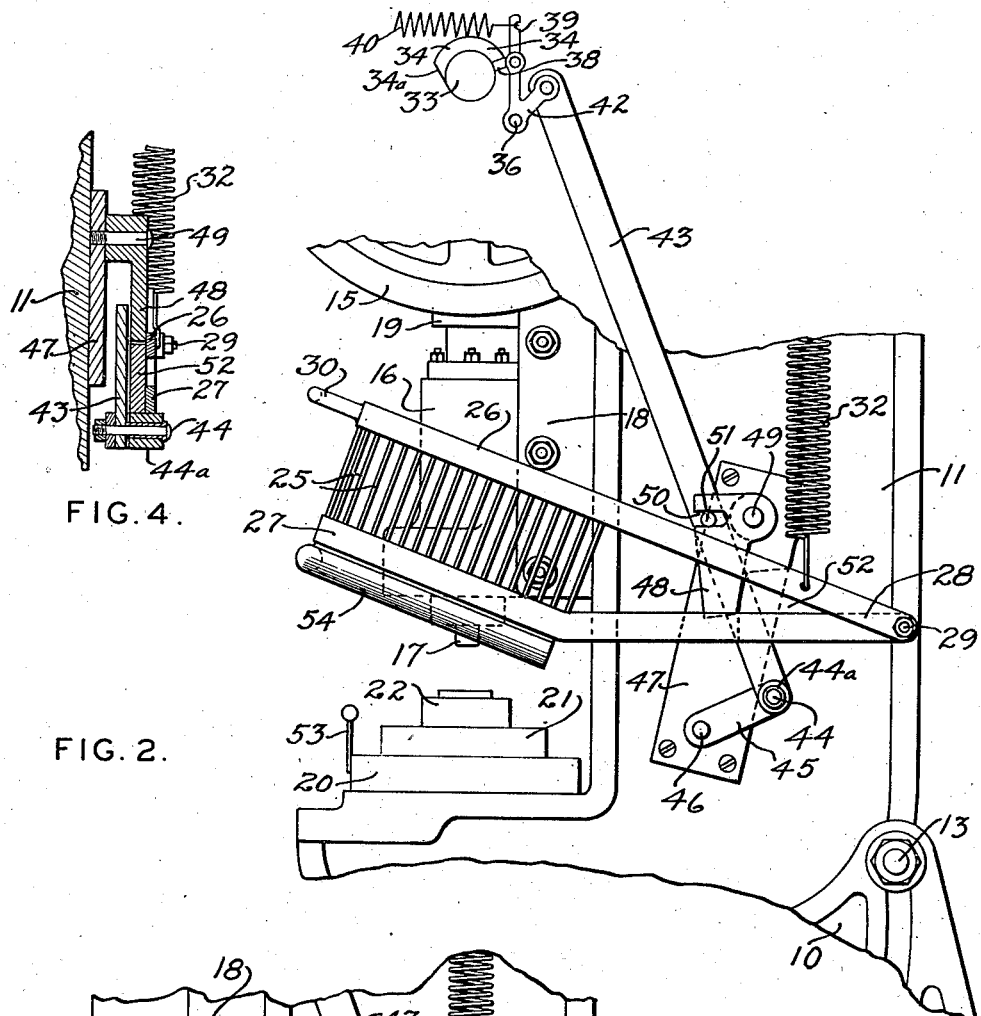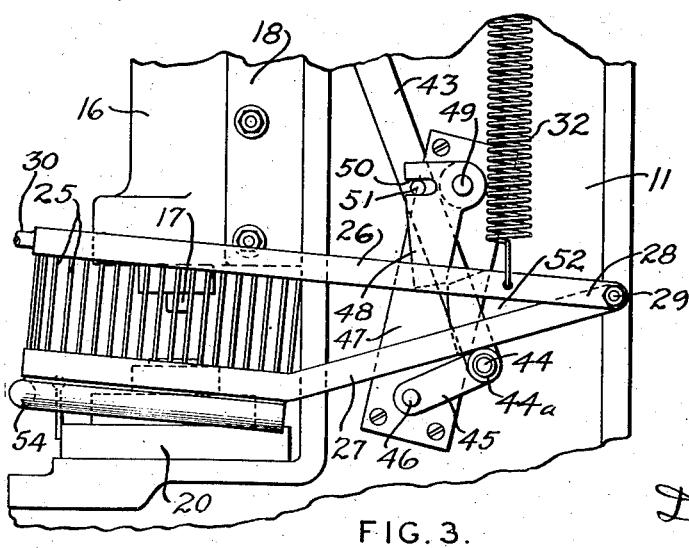

2,382,316

UNITED STATES PATENT OFFICE 2,382,316

PUNCH PRESS GUARD

Ralph R. Hodges, Normandy, Mo., assignor to Carter Carburetor Corporation, St. Louis, Mo., a corporation of Delaware Application August 7, 1942, Serial No. 453,968

3 Claims. (Cl. 192—134)

This invention relates to guard devices for machine tools and consists particularly in a novel guard for presses.

The problem of safe-guarding various types of machine presses so as to positively prevent accident to the operator is one which, so far as applicant is aware, has defied solution, since the guard devices previously known are not 100 percent effective and, in some cases, are clumsy and slow up the operation of the machine.

Accordingly, it is an object of the present invention to provide a punch press guard in which it is absolutely impossible for the operator to hold his hand or finger in a position of danger at any time during the advancing stroke of the tool.

Another object is to provide a guard so connected to the press clutch that the guard is locked in its safety position whenever the clutch is engaged and the clutch is locked in its disengaged position as long as the guard is open.

Still another object is to provide a press guard of the above type in which movement of the safety guard to its safety position is required to initiate the working stroke of the tool.

These objects and other more detailed objects hereafter appearing are attained by the device illustrated in the accompanying drawings in which Fig. 1 is a side view of a known form of punch press device having the novel guard applied thereto.

Fig. 2 is a partial side view of the structure in Fig. 1, but showing the guard in its open position.

Fig. 3 is a partial view similar to Fig. 2, but showing the guard approaching its fully closed or safety position and just prior to engagement of the clutch.

Fig. 4 is a section taken on the corresponding section line of Fig. 1.

Fig. 5 is a detail diagram illustrating the clutching device in the clutch engaging position corresponding with the safety position of the guard as in Fig. 1.

In the figures, the novel guard is applied to a known type of punch press of the tiltable type including a base 10, an upright framing 11 connected to the base by a pivot bolt 12 and sliding bolt 13. Supported on a shaft 14 journalled in the upper part of the frame is a large pulley 15 to which power may be applied through suitable belting (not shown). Shaft 14 is connected through suitable transmission and clutching mechanisms to the vertically reciprocating plunger 16 which carries a punching tool 17. Plunger 16 is slidably carried in suitable guides 18 and 19 on the upright framing. Below plunger 16 is a work table 20 on which is mounted a bolster plate 21 and die plate 22. During normal operation, plunger 16 and tool 17 are driven downwardly against the work which is placed on die plate 22, to perform the desired punching, drawing, forming, cutting, or like operation.

The guard or gate is formed of a series of vertical spokes 25 extending between upper and lower rails 26 and 27 which converge at the sides as at 28 and are pivotally secured to the upright framing by bolt 29. This guard preferably extends around the sides and front of the plunger and has a handle 30 to be grasped by the operator. The guard gate is normally urged upwardly toward its open position, as in Fig. 2 by a coiled spring 32.

As shown in Figs. 2 and 5, the clutchng mechanism includes, in part, the shaft 33 having a raised circumferential rib 34 with a sharp radial shoulder 35. A bell crank is pivoted at 36 adjacent shaft 33 and has an arm 37 angularly carrying a clutch locking pin 38 and having an extension 39 to which is connected a coiled spring 40 normally urging the bell crank counterclockwise and toward the clutch disengaging and locking position. In this normal position of the bell crank, pin 38 rides upon the shaft 33 until the pin is engaged by shoulder 35 to stop rotation of the shaft and disengage the clutch. Clutching mechanism functioning in this manner is well known in the art and is not here illustrated or described in detail.

The bell crank has a second arm 42 pinned to a link 43 which, at its lower end, is pivoted by an elongated pin 44 to a lever 45 permanently pivoted at 46 to a plate 47 on framing 11. A dog 48 is pivoted to plate 47 at 49 and has a slot 50 which receives a pin 51 projecting from link 43. A plate 52 forming a locking abutment is suitably secured to the undersides of guard rails 26 and 27 near the intersection thereof and adjacent dog 48 for cooperating therewith in a manner to be described.

A small guard 53 is secured to and extends upwardly from the front portion of work plate 20 for cooperating with the main pivoted guard. A bumper extension 54, conveniently of a soft material, extends below bottom rail 27 of the guard gate.

This guard mechanism functions as follows:

The guard gate is normally held in its upper or open position, as in Fig. 2, by springs 32 and 40, pin 38 being engaged by shoulder 35 on shaft 33 to lock and disengage the clutching mechanism. In order to engage the clutch and initiate the working stroke of the press, the operator grips gate handle 30 and moves the gate downwardly to the position in Fig. 3 in which the gate closely approaches its fully closed safety position, whereupon, lower rail 27 engages roller 44a and moves this roller and link 43 downwardly. This rotates bell crank arm 42 clockwise and withdraws locking pin 38 from shouldered rib 34 so as to release shaft 33 and automatically engage the clutch mechanism for transmitting power to the press plunger. During the motion of the guard gate from the position in Fig. 3 to that in Fig. 1, the clutch actuating bell crank is withdrawn from its locking position so that the working stroke of the press is initiated coincidentally with and responsive to closing of the guard gate to its safety position.

When the gate is in the safety position of Fig. 1, locking plate 52 abuts the lower end of pivoted dog 48 so that if, for any reason, the clutch actuating device is prevented from moving to its disengaging position, the gate will be locked in its safety position. More specifically, in case the press should inadvertently repeat, as occasionally happens, because of a delay in disengagement of the clutch, the gate will be locked in its safety position.

Shortly after punch tool 17 strikes the work, clutch actuating pin 38 will pass over inclined edge 34a of raised rib 34, permitting counterclockwise rotation of the bell crank by spring 40 and consequent raising of the guard gate under the influence of springs 32 and 40. As the gate and link 43 rise to the position of Fig. 3, locking dog 48 will be rotated by pin 51 so as to clear abutment plate 52 and the gate may then continue in its upward movement under the influence of the springs or a manual lift by the operator. When the gate is up, as in Fig. 2, the right hand edge of locking dog 48 abouts the end of abutment plate 52 to resist counterclockwise rotation of the dog and positively prevent downward movement of link 43 such as is necessary to rotate the bell crank and withdraw clutch locking pin 38. Thus, the press plunger cannot be advanced toward the work as long as the gate is open.

Of course, the guard gates may be operated by a suitable foot treadle, if desired and, the parts may be so designed and balanced as to operate practically as easily and quickly as the manual trip lever by which such presses are normally set into operation. The invention may be modified in various respects as will occur to those skilled in the art and the exclusive use of all such modifications as come within the scope of the appended claims is contemplated.

I claim:

1. In combination with a press, means actuable to initiate the working stroke of the press, a guard having a hand grip for moving the same from an open position to a closed, safety position between the operator and the work, locking means including a part movable with said guard for positively preventing stroke initiating actuation of said first means when said guard is open, and mechanism actuatable solely by said guard as it closely approaches said safety position for actuating said first means to initiate said working stroke.

2. In combination with a press having a stroke producing clutch mechanism, a guard having a handle for moving the same from an open position to a safety position between the operator and the work, means to coincidentally engage said clutch mechanism incidental to substantially full closing of said guard, and cooperating elements on said guard and said mechanism for locking said guard in its safety position responsive to unclutching of said mechanism and for locking said mechanism in its unclutched condition responsive to opening of said guard.

3. In combination with a press having a working part and clutching mechanism for connecting the same to a power source, a device actuatable to clutch and unclutch said mechanism, a guard having a hand grip for moving the same selectively to open and safety positions, means to coincidentally engage the clutching mechanism incidental to substantially full closing of said guard, a locking dog movable with said device, and a locking abutment movable with said guard for cooperating with said dog to prevent unclutching actuation of said device when said guard is open, and to hold said guard in its safety position as long as said device is in its clutching position.

RALPH R. HODGES.